Jan. 22, 1924.
J. S. CARSWELL ET AL
1,481,503
REPAIR STAND FOR MOTORS
Filed Sept. 24, 1920      2 Sheets-Sheet 1
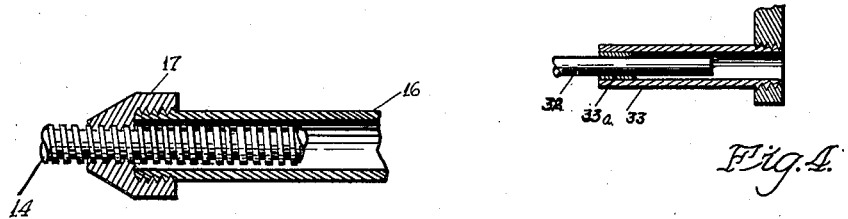
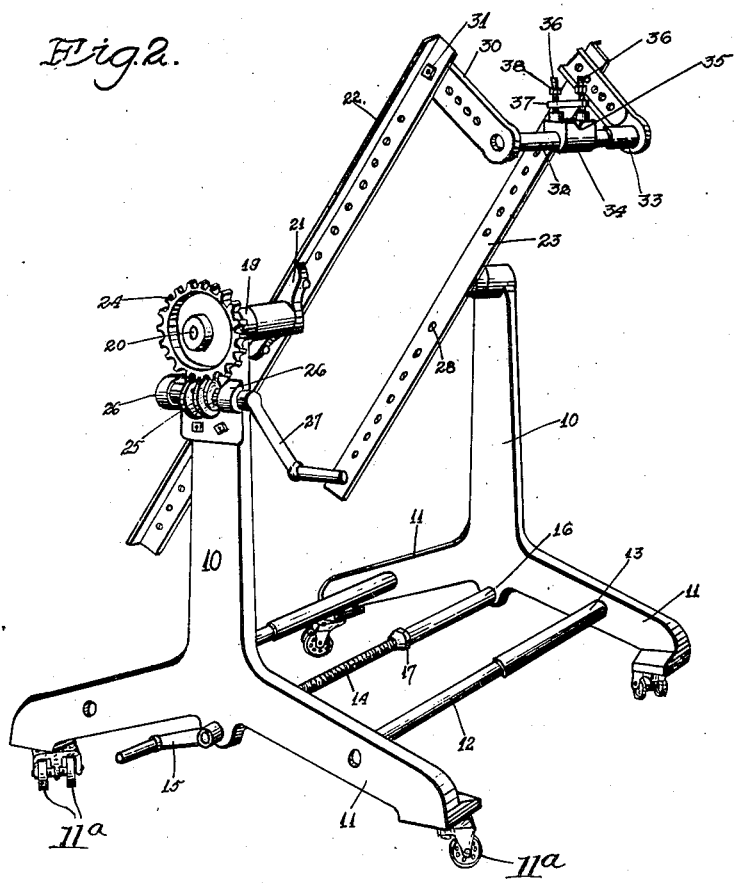
Inventors
J. S. Carswell
A. R. Hammond
by Orving & Hague - Att'ys

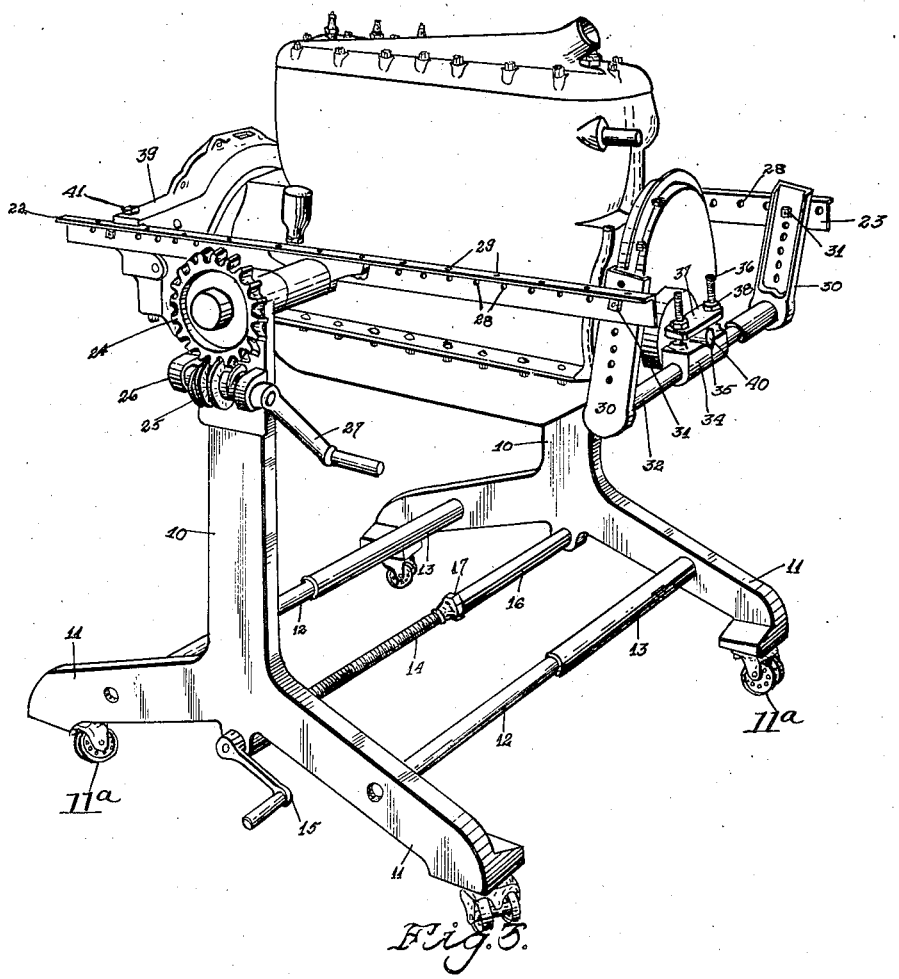

Patented Jan. 22, 1924.

1,481,503

UNITED STATES PATENT OFFICE.

JOSEPH SINCLAIR CARSWELL AND AMIL RAY HAMMOND, OF BOONE, IOWA.

REPAIR STAND FOR MOTORS.

Application filed September 24, 1920. Serial No. 412,606.

*To all whom it may concern:*

Be it known that we, JOSEPH S. CARSWELL and AMIL R. HAMMOND, citizens of the United States, and residents of Boone, in the county of Boone and State of Iowa, have invented a certain new and useful Repair Stand for Motors, of which the following is a specification.

The object of our invention is to provide a repair stand of simple, durable and inexpensive construction, especially adapted for use in connection with the repair of automobile motors or the like.

A further object is to provide a stand of this character which may be readily, quickly and easily adjusted without the use of tools, to receive automobile motors or the like of any of the sizes now in ordinary use, and to thereby provide a universal automobile motor stand.

A further object is to provide a stand of this character in which the motor may be placed and secured readily, quickly and easily, and when so secured may be turned through a complete circle, and when in any position of its adjustment it will be held firmly enough so that work may be done on any part of the motor or its jacket.

A further object is to provide improved means for turning the motor support of the stand, with the motor held therein, to any position of adjustment within a complete circle, and for automatically securing it in any position of such adjustment without the use of fastening devices or tools.

Our invention consists in the construction, arrangement and combination of the various parts of the device, whereby the objects contemplated are attained, as hereinafter more fully set forth, pointed out in our claims, and illustrated in the accompanying drawings, in which:

Figure 1 shows a perspective view of an improved motor stand embodying our invention;

Figure 2 shows an enlarged, detail, sectional view of the means for adjusting the sides of the stand relative to each other;

Figure 3 shows a perspective view of the complete motor stand having a motor supported therein as in practical use; and Figure 4 shows a detail sectional view of the telescoping tubes for supporting a motor shaft.

Referring to the accompanying drawings, we have used the reference numeral 10 to indicate the two standards forming the body of the frame, and each provided with widespread supporting legs 11 mounted on casters 11$^a$. We have provided for adjusting these standards toward and from each other, and at the same time always holding them in parallel positions, as follows:

On one of the standards or supporting legs thereof, are two tubular brace members 12, and on the opposite one are two corresponding tubular brace members 13, telescopically and slidingly connected with each other, and at the central portion of one standard is a screw-threaded rod 14 provided with a crank 15, and on the opposite standard at the center thereof is a tube 16 designed to slidingly receive the screw-threaded rod 14. The specific structure of the connection between the rod 14 and tube 16 is illustrated in Figure 2, and comprises a nut 17 firmly secured to the inner end of the tube 16, preferably by a screw-thread, which nut is screw-threaded to coact with the screw-threaded rod 14. The interior of the tube 16 is large enough to not engage the screw 14 even though the parts 14 and 16 are slightly out of line, to thereby prevent binding.

The operation of the part of the device just described is as follows:

When the operator desires to adjust the standards 10 relative to each other, the crank 15 is moved toward the right or the left, as the case may be, and the nut 17 coacting with the threaded rod 14 will move the sides toward or from each other, depending upon the direction of rotation of the crank. The tubular brace members 12 and 13 will hold the sides 10 in substantially parallel positions during such adjustment.

Furthermore, this construction is a very simple, durable and inexpensive one, and the parts when thus adjusted will be securely held in such adjusted position without the necessity of fastening or in any way securing the crank 15.

At the upper end of one of the standards 10 a bearing 19 is provided, in which a shaft 20 is rotatably mounted, and this shaft 20 is fixed to the bracket 21, which supports side bar 22 for supporting a motor. At the opposite side is a similar shaft, not shown, supporting the mating side bar 23. Fixed to the shaft 20 is a beveled worm gear 24, meshing with a worm 25 mounted in bearings 26 on the standard 10, and said worm is provided with a crank 27.

The side bars 22 and 23 are each formed of an angle bar, and each is provided with a series of perforations 28 on its vertical side member, and another series of perforations 29 on its horizontal or top side member.

At one side of each of the side bars 22 and 23 is a downwardly extending bracket 30, adjustably and pivotally secured to the end portion of the side bar by bolt and nut 31. On the lower end of one of these brackets 30 is fixed a tube 32, and in the lower end of the other one is fixed a tube 33, said tubes being telescopically and slidingly connected. In the tube 33 is a small bushing 33ª, to guide the tube 32 so same will not bind against the sides of the tube 33.

Loosely mounted on the central portion of the tube 32 is a bracket 34, preferably having a V-shaped notch 35 in its upper side, and also having two upwardly extending bolts 36 on opposite sides of the notch. A retaining plate 37 is mounted for vertical movement on these bolts 36, and nuts 38 are also provided on the bolts above the retaining member.

Our device is especially adapted for use in supporting motors of the type which are mounted on the motor chassis on the three-point suspension principle, that is to say, the rear of the motor is usually provided with a rigid member 39 to rest upon the sides of the chassis frame, and the forward end of the motor has either a shaft or bracket 40 at its center, designed to be supported at the central portion of the chassis frame.

It may, however, be adapted for motors of the four-point suspension type, by simply removing the brackets 30 and the parts attached thereto. When this is done both ends of the motor are supported on the side members 23.

In practical operation, and assuming that the motor stand is in the position shown in Figure 1, then it may be adjusted as to width by simply operating the crank 15, as before explained. It may also be adjusted as to length in order to fit any ordinary motor, by adjustably positioning the brackets 30 on the side bars 22 and 23 by means of the bolts 31. When this has been done the motor is placed in position with its rigid member 39 resting on top of the side bar. This rigid member is then firmly secured to the side bars by means of bolts 41 extending through the adjacent openings in the side bars. Then the shaft 40 at the front of the motor is placed on top of the bracket 34 in the V-shaped notch thereof. This bracket may be swung forwardly and rearwardly far enough to securely support the shaft 40, and when it has been thus supported the bolts 31 may be tightened to hold it in such position. Then the retaining plate 37 is firmly screwed down upon the shaft 40, and this coacts with the bolts 31 in preventing any swinging movement of the brackets 30, so that the motor is firmly and immovably secured to the frame very quickly and easily, and after it has been thus secured it is firmly held and may be worked upon when in any position of its adjustment through an entire circle.

It is important, in a device of this kind, that the motor be readily, quickly and easily moved to any position throughout a complete circle, so that the operator may have ready access to it for repair purposes, and it is also important that it be firmly held when in such position. By applying the worm with its crank, to the worm gear, we are enabled to readily, quickly and easily move the stand, with its motor, to any position of adjustment through an entire circle, and we have found that in use the weight of the crank itself is sufficient to prevent any movement of the worm gear when the crank is extended downwardly, so that by turning the crank 27 the motor may be moved to any position, and then when the crank is at its lowermost position the motor will be held firmly enough so that the operator may work on the motor without danger of moving it from its position in which it is held. This is due to the irreversible nature of the worm gear; that is to say, power applied to the crank 27 will turn the motor supporting frame, but power applied to the motor supporting frame will not turn the crank 27.

By having the bracket 34 loosely mounted upon the tube 32, the forward support of the motor may be readily, quickly and easily clamped to said bracket 34 even though the motor itself should not be exactly in line with the side bars, thus obviously saving a great deal of time and work in connecting a motor to the motor stand.

We claim as our invention:

1. In a device of the class described, the combination of two side frame members, two guide members on each of said side frame members spaced apart substantially equal distances from the center of the side frame members, the guide members on one side frame member being telescopically connected to those on the other side frame member, whereby the side frame members are maintained in parallel positions during their movement toward and from each other, a screw threaded shaft mounted in one of the side frame members midway between the guide members thereon, and a screw threaded member to receive the shaft mounted on the other side frame member, and whereby the rotation of the screw threaded shaft will operate to move the side frame members toward and from each other without disturbing their parallel relationship, for the purposes stated.

2. A motor stand of the character described, comprising two side members, means for adjustably securing them in position relative to each other, two side bars pivotally supported to said sides, one being pivotally connected with each of said side members, a bracket adjustably supported at one end of each side bar, a tube connected to one of said brackets, and a tube connected to the other bracket, and telescopically and slidingly connected with each other, a bracket loosely mounted on one of said tubes, and means for securing a motor shaft to said latter bracket.

3. A motor stand of the character described, comprising two side members, means for adjustably securing them in position relative to each other, two side bars pivotally and adjustably supported to said sides, one being pivotally connected with each of said side members, a bracket adjustably supported at one end of each side bar, a tube connected to one of said brackets, and a tube connected to the other bracket and telescopically and slidingly connected with each other, a bracket loosely mounted on one of said tubes, and means for securing a motor shaft to said latter bracket.

4. A motor stand of the class described, comprising two sides, means for adjusting them relative to each other, a side bar pivotally connected to each of said sides, said side bar being formed of an angle bar, the top or horizontal portion thereof being provided with a row of perforations whereby the rear end of the motor frame may be adjustably bolted thereto, brackets pivotally and adjustably connected to the sides or vertical members of said angle bars and extended downwardly therefrom, a tube connected with said brackets, a bracket slidingly mounted on said tube and designed to receive the front end of the motor shaft, and means for securing a motor shaft to said latter bracket, said parts being so arranged that when the rear of the motor is bolted to the side bars the shaft at the front may be readily, easily and quickly clamped to the supporting bracket at the front, whether the engine is exactly parallel with the side bars or not.

Des Moines, Iowa, September 9, 1920.

JOSEPH SINCLAIR CARSWELL.
AMIL RAY HAMMOND.